United States Patent [19]

Caramaschi et al.

[11] Patent Number: 4,551,067
[45] Date of Patent: Nov. 5, 1985

[54] HELICOPTER ROTOR

[75] Inventors: Vittorio Caramaschi, Gallarate; Pier Luigi Castelli, Busto Arsizio, both of Italy

[73] Assignee: Costruzioni Aeronautiche Giovanni Agusta S.p.A., Italy

[21] Appl. No.: 471,342

[22] Filed: Mar. 2, 1983

[30] Foreign Application Priority Data

Mar. 11, 1982 [IT] Italy .................... 67304 A/82

[51] Int. Cl.⁴ .............................. B64C 27/38
[52] U.S. Cl. ..................... 416/140; 416/106
[58] Field of Search ............... 416/106, 107, 140 A, 416/143

[56] References Cited

U.S. PATENT DOCUMENTS

| | | | |
|---|---|---|---|
| 2,614,640 | 10/1952 | Buirid | 416/140 A |
| 2,719,593 | 10/1955 | Alex | 416/140 A |
| 3,533,713 | 10/1970 | Salmun | 416/140 A |
| 3,932,059 | 1/1976 | Rybicki | 416/140 A |
| 4,028,000 | 6/1977 | Weiland et al. | 416/107 |
| 4,203,708 | 5/1980 | Rybicki | 416/140 A X |
| 4,235,570 | 11/1980 | Ferris et al. | 416/140 A X |
| 4,297,079 | 10/1981 | Marshall | 416/143 X |
| 4,368,006 | 1/1983 | Ferris et al. | 416/140 A |
| 4,369,019 | 1/1983 | Lovera et al. | 416/140 A X |

FOREIGN PATENT DOCUMENTS 212105 2/1941 Switzerland ................ 416/107

Primary Examiner—Everette A. Powell, Jr.
Attorney, Agent, or Firm—Kane, Dalsimer, Kane, Sullivan and Kurucz

[57] ABSTRACT

A rotor for helicopters, in which a central hub supports a plurality of radial blades connected thereto, each of which blade is provided with a surface rigidly connected to it and able to cooperate with respective abutment elements supported by the hub and movable with respect to this latter in a substantially horizontal plane to limit the oscillations of the respective blade in a horizontal plane between limits which are variable as a direct function of the angular velocity of the rotor itself.

7 Claims, 2 Drawing Figures

HELICOPTER ROTOR

BACKGROUND OF THE INVENTION

The present invention relates to a helicopter rotor.

In general, a helicopter rotor comprising a central, substantially plate-like hub having a polygonal outline is known; from such hub extend, radially outwardly, a plurality of blades uniformly distributed around a central axis of rotation of the rotor itself. Each of the said blades is normally connected to the hub by an attachment element or bracket a central portion of which extends through a respective axial aperture formed through the hub. The coupling between each attachment bracket and the hub is normally made by an elastomeric coupling interposed between the said central portion of the bracket and a bridging element extending along the periphery of the hub and delimiting the radially outer part of the said aperture.

Each of the elastomeric joints mentioned above permits an associated blade to perform relatively large oscillations about its centre which can be separated into components of vertical oscillation perpendicular to the plane of rotation, and horizontal oscillation coplanar with the rotor.

It is known to limit in any one case the amplitude of the said vertical oscillations by dynamic elements acting to prevent substantial upward and downward displacements during the acceleration and deceleration phases respectively. The said horizontal oscillations are, on the other hand, normally controlled by dampers which, in some particularly critical situations, have been found to be wholly inadequate These critical situations occur, in particular, upon take off when the ambient and atmospheric conditions are not favourable, for example gusts of cross winds upon take-off from the bridge of a ship. In this case the dampers normally utilised are not able to absorb the relatively high dynamic loading due to the inertial displacements of the blades with the risk that oscillatory strains of such violence can be transmitted to the rotor as not only to impede a normal take off, but also to cause the helicopter to capsize.

The use of more powerful dampers has been found to be inadvisable since although on the one hand these would improve the performance of the helicopter upon take off in critical conditions, on the other hand they would cause a deterioration in the performance thereof in normal operating conditions.

SUMMARY OF THE INVENTION

The object of the present invention is that of providing a rotor in which the inertial oscillations of the blades in the plane of the rotor can be limited according to a predetermined law and without preventing the blades themselves from assuming their correct dynamic inclination in normal flying conditions.

The said object is achieved by the present invention in that it relates to a helicopter rotor comprising a central hub rotatable about its axis for rotating a plurality of blades extending substantially radially outwardly of the hub and connected to this latter by coupling means which permit, among other things, the blades to oscillate with respect to the said hub in a plane perpendicular to the said axis; characterised by the fact that each said blade has a fixed surface able to cooperate with respective abutment means supported by the said hub to limit the oscillations of the blade itself in the said plane between limits which are variable within a predetermined range as a direct function of the angular velocity of the hub itself; the said abutment means being movable with respect to the said hub in the said plane by the effect of centrifugal forces and against the action of resilient means, and the said surfaces being substantially perpendicular to the said plane.

BRIEF DESCRIPTION OF THE DRAWINGS

Further characteristics and advantages of the present invention will become apparent from the following description with refeence to the attached drawings, which illustrate a non limitative embodiment thereof, in which.

DETAILED DESCRIPTION OF THE INVENTION

Figure 2:
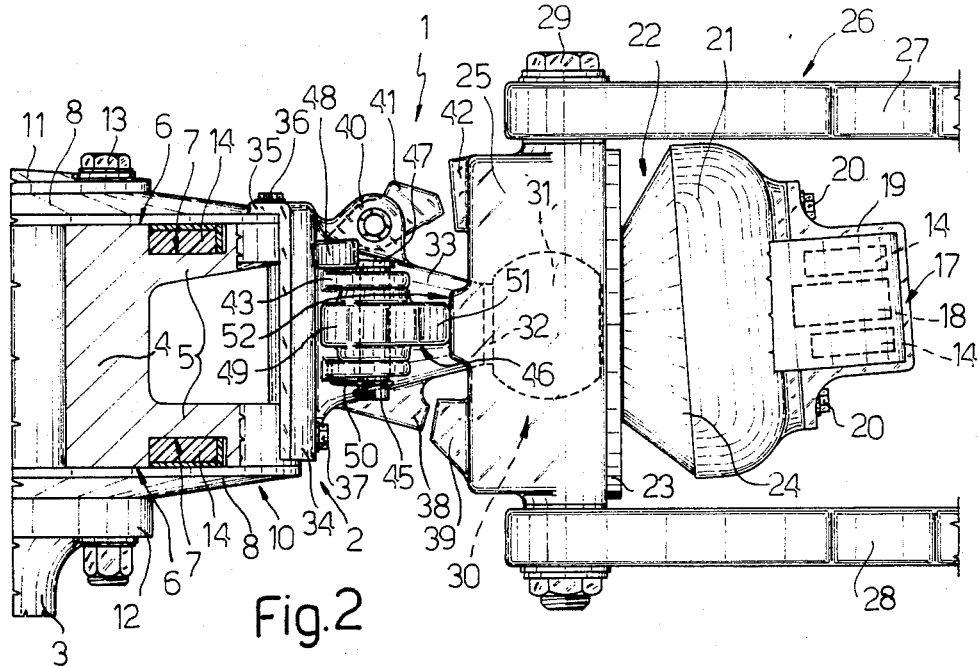
FIG. 2 is a side view, with parts in section, of the portion of the rotor illustrated in FIG. 1.

The attached Figures illustrate a helicopter rotor generally indicated with the reference numeral 1 and including a central hub 2 supported by a transmission shaft 3. The rotor 1 further includes a plurality of blades (not illustrated) uniformly distributed around a central axis of rotation of the hub 2 and extending outwardly in a substantially radial direction.

As illustrated, in particular in FIG. 2, the hub 2 includes a central tubular body 4 having two external annular end ribs 5 limited axially by two flat annular surfaces 6 perpendicular to the said central axis with which the body 4 is coaxial.

The surfaces 6 are provided with a plurality of U-shape channels 7 which are uniformly distributed about the said central axis and are radially outwardly concave. The channels 7 are closed by two annular plates 8 connected to respective surfaces 6 by screws 9 (FIG. 1) and form with the tubular body 4 a tubular metal jacket 10 closed above by a cover 11 and supported from below by an end flange 12 of the shaft 3. The connection between this latter, the jacket 10 and the cover 11 is formed by a ring of axial through bolts 13.

Each of the channels 7 is occupied by an inner portion of an annular band 14 extending outwardly of the jacket 10 and rigidly connected to two contiguous bands by cover elements 15 disposed close to the jacket 10. The bands 14 are preferably made of oriented synthetic fibres and lie in two oppositely directed frusto-conical surfaces disposed with their larger bases substantially in contact with one another and their smaller bases connected to the opposite axial ends of the jacket 10.

Each upper band 14 is aligned with a corresponding lower band 14 to define with its latter an axial aperture 16 (FIG. 1) which is limited on the side adjacent the hub 2 by a bridge 17. This latter, as illustrated in FIG. 2, is mainly constituted by three superimposed layers the outer layers of which are formed by sections of band 14 and the intermediate layer of which is a section of an annular band 18 extending around the whole of the periphery of the hub 2 and preferably made of oriented synthetic fibres.

As illustrated in particular in FIG. 2, on each bridge 17 there is fitted a U-shape bracket 19 disposed in a vertical plane and concave radially towards the jacket 10. The free ends of each bracket 19 are connected by screws 20 to an outer shoe 21 of an elastomeric coupling 22 including an inner shoe 23 and a block 24 of elastomeric material rigidly connected to the shoes 21 and 23.

Each shoe 23 is connected to the outer surface of a plate 25 constituting an intermediate portion of a respective substantially U-shape bracket 26 which is disposed in a substantially vertical plane and concave radially outwardly of the hub 2. Each bracket 26 includes a flat upper plate 27 and a flat lower plate 28, both being substantially horizontal and disposed one above the other across the associated bridge 17 and connected together and to the plate 25 by through bolts 29.

The outer free ends of the plate 27 and 28 clamp together the attachment root (not illustrated) of a respective blade (not illustrated) which is fixed to the plates 27 and 28 by through bolts (not illustrated) similar to the bolts 29.

Through each plate 25 is mounted a second elastomeric coupling 30 including a knee joint 31 ridigly connected to the plate 25 and slidably mounted on a cylindrical end section 32 of a frusto-conical tubular projection 33 extending from a base plate 34 into the associated aperture 16 in a substantially radial direction with respect to the jacket 10.

Each plate 34 has an upper edge 35 folded over the upper annular plate 8 and fixed to this latter and to the upper flange 5 by screws 36 parallel to the axis 4. Each plate 34 is connected beneath to the lower rib or flange 5 by radial screws 37.

Each projection 33 has a lower protuberance 38 which can cooperate with a corresponding protuberance 39 of the associated plate 25 to limit the downward flapping of the associated blade (not illustrated) and an upper fork 40 carrying a hinged rocker 41. This latter is rotatably mounted in a substantially vertical plane and is able to cooperate with a protuberance 42 of the associated plate 25 to limit the upward flapping of the associated blade (not illustrated) in dependence on a law variable with angular velocity of the rotor 1.

Outwardly from the lateral surface of each projection 3 extend two further forks 43 disposed on opposite sides of the associated projection 33 in a plane substantially perpendicular to the axis of rotation of the hub 2. Each fork 43 supports a pivot 44 substantially parallel to the said axis and rotatably supporting a tubular shaft 45, which latter is rigidly connected to a rocker 46 and an arm 47 provided with an eccentric mass 48.

Each rocker 46 is substantially perpendicular to its associated arm 47 and they lie in parallel planes substantially perpendicular to the associated pivot 44.

Each rocker 47 extends in a direction substantially parallel to the associated projection 33 and has an inner arm 49, normally maintained in contact with the outer surface of the projection 33 by a helical spring 50 interposed in a known way between the tubular shaft 45 and the associated pivot 44, and an outer arm 51 disposed, at rest, with its end facing an abutment surface 52 formed on the associated plate 25 and substantially parallel to the axis of rotation of the hub 2. The distance, at rest, between the free end of each arm 51 and the associated surface 52 is such as to allow the associated blade to oscillate about an angle of, at most 10° about a centre position.

Figure 1:
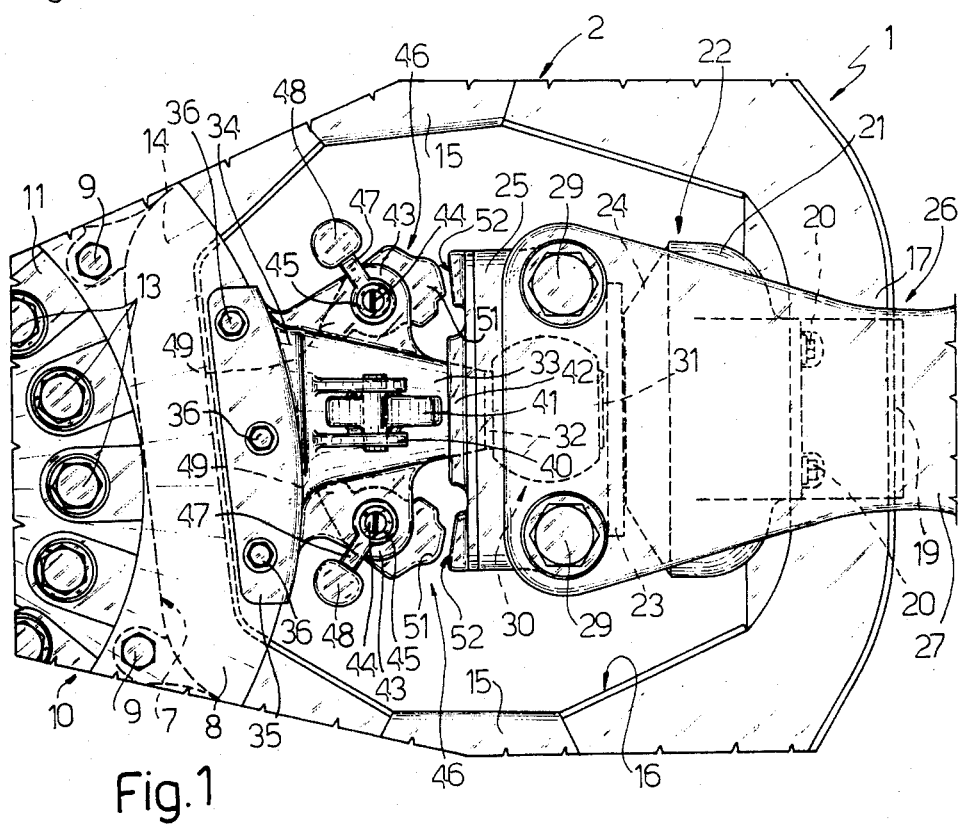
FIG. 1 is a partial plan view of a helicopter rotor formed according to the principles of the present invention.

As illustrated in FIG. 1, the arms 47 are spaced from the associated projections 33 in such a way as to cause, due to the centrifugal force applied to it during rotation of the rotor 1, the associated arms 51 to approach the associated projections 33 and a disalignment of the free end of these arms with respect to the associated surfaces 52 in such a way as to permit the associated blade to oscillate freely, in operation, in a plane perpendicular to the axis of rotation of the hub 2.

The above described arrangement permits, upon take off, or during landing, the inertial displacements of the blade to be contained within predetermined limits thereby in this way preventing dangerous vibrations from being generated within the interior of the rotor 1 in critical ambient situations, the effects of which vibrations could be dramatic.

In the illustrated embodiment the rockers 46 are advantageously mounted on associated projections 33 in protected positions within the associated aperture 16; however it is obvious that the rockers 46 and the associated surfaces 52 could be carried by the hub 2 and, respectively, by the associated blade in any other position as long as the direction of the axis of rotation of the rockers 46 and their relative position with respect to the associated surfaces 52 is not substantially varied.

We claim:

1. A helicopter rotor including a central hub rotatable about its axis having a plurality of blades affixed thereto, the blades extending radially outwardly of the hub, a coupling means which connects the blades to the hub and permits the blades to oscillate with respect to the hub in a plane perpendicular to said axis wherein each blade further comprises:

a surface (52) positioned substantially perpendicular to said plane and rigidly connected to the blade for limiting oscillations of the blade in said plane;

an abutment means (46) supported by the hub (2) and cooperating with the surface (52) to limit oscillation in said plane within variable limits in a predetermined range as a direct function of the angular velocity of the hub (2) itself wherein the abutment means (46) is movable with respect to the hub (2) in said plane by the effect of centrifugal force wherein the abutment means further comprises two rockers rotatably mounted about axes which are substantially parallel to the axis of rotation of the hub (2), the rockers rotatable between a first position in which one of the arms (51) of each said rocker (46) is disposed facing surface (52) at a predetermined distance therefrom, and a second position in which said arm is rotated so that it is no longer facing surface (52) and is outside the path followed by surface (52);

a resilient means (50) which is in elastic communication with the abutment means (46) and which acts on the abutment means in a direction against the direction of centrifugal force.

2. A motor according to claim 1 further comprising: an eccentric mass (48) adapted to rotatably urge arm (51) and extending substantially perpendicular to the abutment means (46), the eccentric mass urging outwardly during rotation of the motor as a result of centrifugal force; wherein the resilient means is on a torsion spring in mechanical communication with the eccentric mass adapted to resist outward movement of the mass.

3. A rotor according to claim 1, wherein each said rocker (46) is provided with an eccentric mass (48) rigidly connected thereto.

4. A rotor according to claim 1, further comprising a coupling means 10 for each said blade, a U-shape bracket (26), an axial aperture 16 of the said hub (2) through which the U-shaped bracket extends; each said surface (52) being formed on an associated said bracket (26).

5. A rotor according to claim 4, further comprising a pojection (33) a central portion 10, and an associated aperture 16, the projection 33 extending in a substantially radial direction from the central portion (10) of the said hub (2) into the associated said aperture (16).

6. The invention in accordance with claim 1 wherein the cooperation of the abutment means (46) with surface (52) comprises contact between a surface of the abutment means (46) and surface (52) providing a non-rigid connection therebetween and limiting the bending moment transferred to the rotor.

7. A helicopter rotor including a central hub rotatable about its axis having a plurality of blades affixed thereto, the blades extending substantially radially outwardly of the hub and including a coupling means affixed to the hub permitting the blades to oscillate with respect to the hub in a plane perpendicular to said axis, the rotor further comprising a surface (52) rigidly connected to each blade, an abutment means (46) which cooperates with the surface (52) and is attached to the hub, limiting oscillations of the blade in said plane in a predetermined range as a function of the angular velocity of the hub, the abutment means (46) being movable with respect to the hub in said plane by the effect of centrifugal force and against the action of a resilient means (50), the resilient means in elastic communication with the abutment means (46) wherein the surface 52 is substantially perpendicular to said plane, and further comprising a projection (33) and an associated aperture (16), the projection extending in a substantially radial direction from a central portion (10) of the hub into the associated aperture (16), wherein the abutment means (46) are affixed to the projection (33), the abutment means extending laterally from projection (33) in a plane parallel to the plane of rotation of the hub.

* * * * *